Jan. 30, 1962  P. F. C. SIERHUIS  3,018,612
ALARM REPEATING MECHANISM FOR AN ALARM CLOCK
Filed Dec. 9, 1957
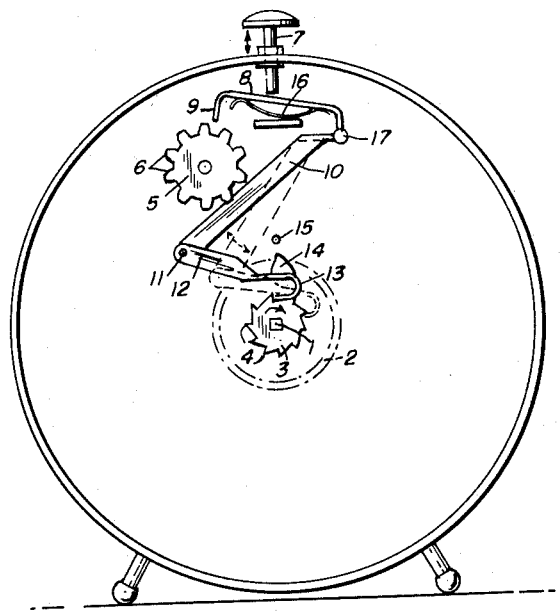
INVENTOR
PAUL FRANS C. SIERHUIS
ATTORNEYS

United States Patent Office 3,018,612
Patented Jan. 30, 1962

3,018,612
ALARM REPEATING MECHANISM FOR AN ALARM CLOCK
Paul Frans Christiaan Sierhuis, Keizersgracht 243–245, Amsterdam, Netherlands
Filed Dec. 9, 1957, Ser. No. 701,649
Claims priority, application Netherlands Dec. 19, 1956
2 Claims. (Cl. 58—21.12)

The invention relates to an alarm repeating mechanism for an alarm clock provided with an operating knob cooperating with a brake lever rotatably mounted on a spindle under the influence of a return spring, which lever can stop the alarm mechanism in the operative position and is provided with a tooth which cooperates with a tooth wheel mounted on a spindle of the clockwork when the alarm mechanism is stopped, so that the brake lever gradually returns to the rest position and liberates the alarm mechanism again after an elapsed time and enables it to start working again.

A mechanism is known in which the brake lever has an axis of rotation lying near the periphery of the clock housing and about in the radial extension of the central spindle of the clockwork and a detent on the signal clapper of the alarm mechanism. The lever comprises a brake arm which enters into the path of the detent on the signal clapper in the working position, and in the extension of this brake arm the lever is provided with a tooth which can cooperate with a tooth wheel on the central spindle. The brake arm further has a branch cooperating with the operating knob and an arm extending downwards and cooperating with the return spring. This construction differs from a normal alarm clock mechanism and is complicated, while the toothed wheel on the central spindle must be secured thereto in such a manner that it can be turned back with respect to the central spindle without the clockwork being stopped and it must be arranged sufficiently firm on this spindle so that, after pressing the operating knob, it can return the brake lever from the operative position to the rest position. It is difficult to make such a construction durable because the moment of rotation acting on the clock spindle becomes weaker caused by wear of the clockwork and increase of friction. This mechanism cannot be stopped definitely as with this construction stoppage will cause the slipping coupling of the tooth wheel on the clock spindle to be unfavourably loaded.

The invention provides a very simple mechanism of the above kind wherein the drawbacks are eliminated.

According to the invention the brake lever is carried out as a brake arm which is extended beyond the axis of rotation by a lengthening arm to which an additional arm is hinged which is provided with a tooth near its end, which tooth can cooperate with a toothed wheel which is carried out as a ratchet wheel and fixed on the clock spindle in such a manner that when the operating knob is pressed in for stopping the alarm mechanism, the hinged arm with the tooth is slidingly displaced over the teeth of the ratchet wheel against the direction of rotation thereof and finally hooks in the teeth thereof under the influence of the returning forces acting on the brake lever; and the brake lever is steadily permitted to return to the rest position by the gradual rotation of the ratchet wheel, until the brake lever liberates the alarm mechanism again. Notwithstanding the fact that in this construction the tooth wheel is fixed on the clock spindle, no forces act in opposition to the direction of rotation of the clock spindle and therefore there are no forces affecting the continued working of the clockwork. In addition the construction is very simple and necessitates no alteration of the normal alarm clock mechanism, so that the manufacturer can make a normal series of non-repeating alarm clocks and by replacing or completing the normal brake arm and arranging the additional ratchet wheel can make a series of repeating alarm clocks according to the invention. In this connection it can further be mentioned that usually the central spindle of a normal alarm clockwork is provided with a square portion at the end, so that no alteration of the normal parts is necessary. The mechanism according to the invention has the important advantage that it is very simple to make. According to a further development of the invention the hinged arm is provided with a second or blocking tooth which can be brought into cooperation with a detent which is fixedly arranged above the ratchet wheel on the clockwork frame by turning the whole clock upside down with the operating knob pressed in and can be maintained in cooperation therewith under the influence of the returning forces acting on the brake lever by liberating the operating knob in this position, so that the clock can be returned to the normal position but the alarm mechanism is definitely blocked until the control knob or the winding-up mechanism of the alarm mechanism is again operated, whereby the blocking tooth comes free from the detent and the cooperation of the hinged arm with the ratchet wheel is restored. For definite blocking a normal clockwork frame is only to be provided with a fixed detent. The construction has the further advantage that when the alarm mechanism is definitely blocked or stopped, the ratchet wheel rotates free from the hinged arm with the two teeth.

The invention will now be further described with reference to an embodiment shown in the drawing.

The drawing shows a rear elevation of an alarm clock with an alarm repeating mechanism and a definite blocking mechanism according to the invention, the cover plate of the clock housing being omitted.

In the drawing 1 indicates the central spindle of a normal alarm clockwork on the square end of which, projecting out of the clockwork frame (not shown), a toothed wheel 3 with saw teeth 4 is fixedly mounted. Spindle 1 is driven by a gear 2 which is the conventional minute hand driving gear. The alarm escapement wheel is indicated at 5 and is provided with teeth 6 with which an alarm anchor or escapement cooperates (not shown) and causes the alarm signal in the usual manner. For stopping the alarm signal after the alarm mechanism has started working at the adjusted time, the clock housing is provided with an operating knob 7, which cooperates at the inside of the clock housing with a brake arm 8 which is rotatably journalled at 17 in the clockwork frame and has a bent end 9 which can be pressed between two teeth 6 of the alarm wheel 5 by pressing in the operating knob 7, whereby further rotation of the alarm wheel is prevented and the alarm mechanism is stopped in the usual manner. The brake arm 8 is urged by a weak return spring 16, as is usual with normal alarm clocks without alarm repeating mechanism, and which has only sufficient power for returning the brake arm and eventually the operating knob to the rest position and maintaining them in the rest position when the brake arm is not maintained in the stopping position by other forces acting on it, such as the pressure of a tooth of the alarm wheel on the bent end 9 thereof in the ordinary alarm clocks. The brake arm 8 is further extended beyond its axis of rotation 17 into a lever by a lengthening arm 10 which is rigidly connected to it. The lengthening arm 10 is further connected at its end with an additional arm 12 which is hinged to it at 11 and which in the shown embodiment is bent back downwards at its free end, whereby a tooth 13 is formed, which is kept in cooperation with ratchet wheel 3 by the weight of the additional arm in the normal position of the alarm clock. At the upper side the additional arm 12 is provided with a blocking tooth 14 near the end, which blocking tooth, for the definite blocking or stopping of the alarm mechanism, can be brought into cooperation with a fixed detent (pin) 15 arranged on the clockwork frame (not shown) by turning the whole clock upside down with operating knob 7 pressed in and then loosening the operating knob and returning the whole clock to the normal position, in which position the additional arm is maintained free from the ratchet wheel 3.

The shown mechanism work as follows:

The drawing shows the alarm repeating and blocking mechanism in the rest position, so that the alarm mechanism can start working at a predetermined time. When the clock gives an alarm signal and this signal is to be stopped, this can be done by pressing in the operating knob 7 whereby the bent end 9 of the brake lever 8, 17, 10 engages between a pair of teeth 6 of the alarm wheel 5 which is under the influence of the alarm work spring, and by the pressure of the tooth of the alarm wheel pressing against the bent end 9 of the brake lever the bent end of the brake arm has the tendency to be pressed out again. This moving out, however, is prevented by the fact that the additional arm 12 is displaced to the right over the ratchet wheel 3 during pressing in of the operating knob 7 and engages with its tooth 13 lying at the underside behind one of the ratchet teeth of the ratchet wheel, as shown by way of example in dotted lines in the drawing. In the drawing the ratchet wheel is mounted on the central spindle of the clockwork and has twelve teeth so that after about five minutes the wheel has rotated over one tooth. The construction is made in such a manner that by pressing the operating knob 7 the tooth 13 is moved back somewhat more than one tooth over the ratchet wheel, so that by the rotation of the central spindle with the ratchet wheel (counter clockwise in the drawing) after about five minutes the position is reached in which the alarm wheel can press the bent end 9 out of its teeth under influence of the driving spring and the alarm mechanism starts working again. By pressing down the operating knob 7 the alarm signal can again be stopped, after which the working cycle of the repeating mechanism begins again.

If it is desired to stop or block the alarm clock definitely, this can occur by turning the whole alarm clock upside down with the operating knob 7 pressed in, whereby under the pull of gravity the additional arm 12 moves away from the ratchet wheel and engages with the blocking tooth 14 arranged at the upper side of the additional arm behind the fixed detent 15. When the control knob is loosened, the pressure of the alarm clock spring will maintain the brake lever with the additional arm 12 pressed against the detent 15 over the tooth behind the bent end 9 of the brake arm, so that the clock can be returned to the normal position. The alarm mechanism is then definitely blocked or stopped. This definite blocking or stopping can be annulled either by again pressing the operating knob 7, whereby the pressure of the alarm wheel by which the blocking tooth 14 is pressed against the detent 15 over the brake lever and the additional arm, is temporarily nullified and the additional arm drops down and comes in contact with the ratchet wheel 3 on the central spindle; or by winding up the alarm spring, whereby the alarm wheel is rotated opposite to the force of the alarmwork spring and the force of the spring on the blocking tooth is nullified temporarily. The return spring 16 of the brake arm 8 is too weak to maintain the additional arm 12 against the detent 15. Also, the tooth 14 drops from the detent 15 whereby the cooperation of the additional arm and the repeater tooth 13 with the ratchet is restored.

Having now particularly described my said invention and the manner in which the same is to be performed, what I claim is:

1. In an alarm repeating mechanism for an alarm clock of the type having a toothed wheel in an alarm train, a knob for manual operation and a brake arm secured to said knob to interengage at one end with said toothed wheel to stop the alarm operation, a ratchet wheel fixed to a spindle of the time mechanism, an additional arm pivoted to said brake arm and extending across said ratchet wheel and normally held in engagement therewith by gravity, a tooth formed on said additional arm to engage the ratchet, whereby upon pressing the knob to engage said brake arm to terminate the alarm action, the said tooth engages behind a tooth of said ratchet wheel to initially hold the brake arm in interengaging relation with said toothed wheel and to subsequently release the brake arm when the ratchet wheel has rotated toward said brake arm with the time mechanism, and a second tooth formed on said additional arm, a detent fixed to the clock and disposed normally above the ratchet wheel whereby upon inverting the clock with the knob depressed the said second tooth engages the said detent to hold the brake arm in interengaging relation with the toothed wheel until the next succeeding alarm cycle.

2. In an alarm clock of the type including a circular frame, a toothed alarm escapement wheel near the periphery of said circular frame and a rotatable central spindle of the time mechanism, and comprising a toothed ratchet wheel fixed for rotation with said central spindle, a brake arm pivoted to said frame adjacent said escapement wheel on an axis parallel to the axis of said escapement wheel and having a projection engageable between said alarm escapement wheel teeth to stop motion of said alarm escapement wheel, spring means to normally bias said brake arm out of engagement with said alarm escapement wheel, manual means to engage said brake arm with said alarm escapement wheel, said brake arm also having brake retaining and releasing means in the form of an additional arm pivoted to said brake arm and normally biased by gravity against said ratchet wheel, a tooth on said additional arm engageable with a tooth of said ratchet wheel when said brake arm is engaged with said alarm escapement wheel by said manual means, said tooth on said additional arm being released under the influence of said spring means from said ratchet wheel by rotation of said rotatable central spindle.

References Cited in the file of this patent

UNITED STATES PATENTS

| 2,216,523 | Schlenker | Oct. 1, 1940 |

FOREIGN PATENTS

| 471,689 | France | July 17, 1914 |
| 650,482 | France | Sept. 24, 1928 |
| 588,559 | Germany | Nov. 27, 1933 |
| 563,121 | Belgium | December 1957 |
| 833,112 | Great Britain | Apr. 21, 1960 |